United States Patent [19]

Zeller

[11] 4,123,948

[45] Nov. 7, 1978

[54] ENERGY ABSORPTION ELEMENT

[75] Inventor: Gregor Zeller, Obernau, Main, Fed. Rep. of Germany

[73] Assignee: Firma Petri AG, Aschaffenburg, Fed. Rep. of Germany

[21] Appl. No.: 783,286

[22] Filed: Mar. 31, 1977

[30] Foreign Application Priority Data

Apr. 1, 1976 [DE] Fed. Rep. of Germany ....... 2614041

[51] Int. Cl.² .............................................. B62D 1/10
[52] U.S. Cl. ........................................ 74/492; 74/552
[58] Field of Search ......................... 74/492, 493, 552; 188/1 C

[56] References Cited

U.S. PATENT DOCUMENTS

| 3,167,974 | 2/1965 | Wilfert | 74/552 |
| 3,364,785 | 1/1968 | Geller | 74/552 |
| 3,373,630 | 3/1968 | Heurtebise | 74/492 |
| 3,528,530 | 9/1970 | Franck et al. | 74/492 X |
| 3,564,688 | 2/1971 | De Gain | 74/492 X |
| 3,589,210 | 6/1971 | Norman | 74/552 |
| 3,972,390 | 8/1976 | Melton et al. | 188/1 C |

FOREIGN PATENT DOCUMENTS

| 2,035,937 | 1/1972 | Fed. Rep. of Germany | 74/492 |
| 2,065,832 | 8/1971 | France | 74/492 |

*Primary Examiner*—Carlton R. Croyle
*Assistant Examiner*—Michael Koczo, Jr.
*Attorney, Agent, or Firm*—Bacon & Thomas

[57] ABSTRACT

Disclosed is an energy absorption element adapted for connecting a vehicular steering wheel to a steering wheel shaft, comprising a generally tubular body comprised of a plurality of support members extending axially between the steering wheel and the steering wheel shaft, and means incorporated in the support members for producing a radially outward collapse of said support members in response to an impact upon the steering wheel. Preferably each support member comprises an X-shaped configuration having an outward bend located in the area of intersection of the legs of the X-shaped configuration.

10 Claims, 5 Drawing Figures

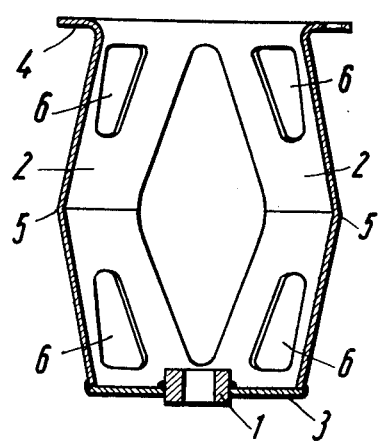
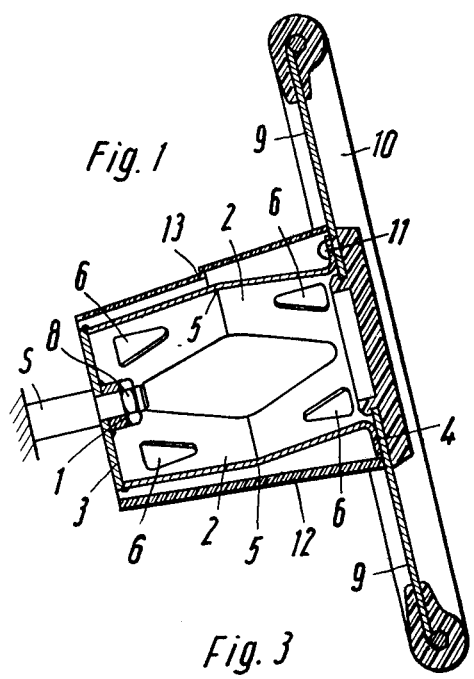
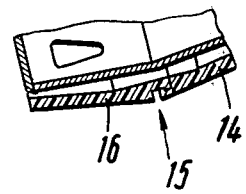
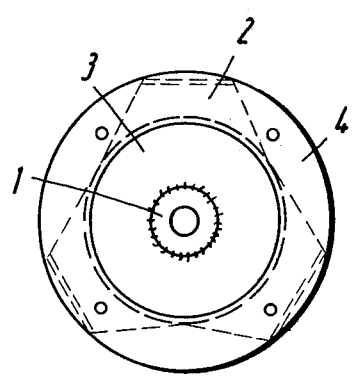
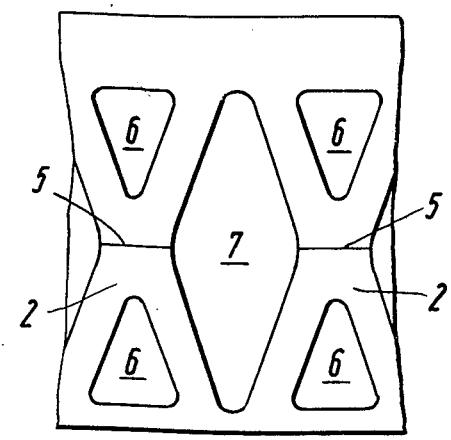

ENERGY ABSORPTION ELEMENT

BACKGROUND OF THE INVENTION

The present invention relates to an energy absorption element and more especially to an energy absorption element designed for use on a vehicular steering wheel.

In the case of most of the known energy absorbing deformation elements which are used in connection with steering wheels and steering wheel shafts of motor vehicles as safety protection, for example, when the body of the driver impacts against the steering wheel in collision accidents or the like, the danger exists that, upon an impact load, portions of the element lay down toward the inside over the steering wheel spindle or hub, and thus block a significant portion of the deformation path. Even in the case of the so-called cross-lattice deformation elements, which consist of a cylindrical tubular body formed of lattice rods, a significant portion of the deformation path is lost because of the required connecting webs and intersection knots between the lattice rods, which collapse upon one another into a block under a load and thus reduce the theoretical deformation path. In order to maintain the required deformation path, it is therefore necessary to construct such devices correspondingly higher, which is often not possible because of lack of space.

SUMMARY OF THE INVENTION

It is therefore an object of the present invention to provide an improved energy absorption device.

Another object is to provide an improved energy absorption device for use in connection with automotive steering wheels.

A particular object of the invention resides in the provision of an improved energy absorption device wherein the full distance between the steering wheel and the steering wheel shaft is available as a deformation path.

Still another object of the invention is to provide an improved steering wheel assembly embodying such an improved device.

In accomplishing these objects, there has been provided in accordance with the present invention an energy absorption elements adapted for connecting a vehicular steering wheel to a steering wheel shaft, the element comprising a generally tubular body comprised of a plurality of support members extending axially between the steering wheel and the steering wheel shaft, and means incorporated in the support members for producing a radially outward collapse of said support members in response to an impact upon the steering wheel. Preferably, the outward collapse producing means comprises an outward bend in each of said support members. In the preferred embodiment, each of the support members comprises an X-shaped configuration. According to one advantageous embodiment, the support members comprise an integral piece formed into a tubular configuration, preferably by stamping from the wall of a tubular piece of metal.

BRIEF DESCRIPTION OF THE DRAWINGS

In the drawings:

FIG. 1 illustrates a cross-sectional side view of a steering wheel with an installed energy absorption element according to the invention;

FIG. 2 shows an isolated cross-sectional side view of an energy absorption element in a somewhat enlarged illustration;

FIG. 3 is a sectional illustration of a segment of the wall of the energy absorption element illustrated in FIG. 1;

FIG. 4 shows a plan view of the device illustrated in FIG. 2; and

FIG. 5 illustrates a view of a wall segment of the energy absorption element unrolled into a plane.

DETAILED DESCRIPTION OF PREFERRED EMBODIMENTS

The aforementioned disadvantage is avoided by means of the invention, in accordance with which the energy absorption element consists of support elements, such as metal strips, rods, webs, or the like, which are adjacently arranged in a circle and are connected to each other at their ends. Upon a collision load of the steering wheel, an outward buckling of the support elements is effected, for example, through the arrangement of outwardly directed predetermined buckling points. The support elements can preferably be configured in an X-shape, and, in the area of the intersections of the legs of the X, they have an outwardly directed predetermined crease. They can be produced in one piece, for example, by stamping from the wall of a tubular body. However, they can also consist of individual elements, which are connected to each other at their ends.

In a support body configured in accordance with this invention, the outwardly precreased supports bend radially away from the steering wheel shaft in the case of the impact of a body on the steering wheel, and therefore the full deformation path from the plane of the steering wheel rim to the upper edge of the steering wheel hub is available.

The energy absorption element illustrated in the drawings consists of three X-shaped support elements 2, for example, webs, struts, rods, or the like, of metal, which are circularly arranged around the hub 1 and which are connected to each other at the bottom by means of a disc 3 and at the top by a flange 4. The hub, designated by reference numeral 1, is located on the disc 3. The X-shaped support elements 2 evidence an outwardly directed crease 5 in the cross area, determining the direction of buckling in the case of a collision load. The X-shape of the support elements has the consequence that relief apertures 6 are formed at the top and bottom in the support body, and diamond-shaped intermediate spaces 7 are formed between the support elements. The support elements can also have any other appropriate shape, which, on the one hand, provides the required stability for the connection of the steering wheel with the steering wheel shaft, and, on the other hand, assures a reliable buckling out of the supports when required. Instead of three support elements, obviously a greater number can also be provided.

The support body which is formed of the support elements 2 is fastened at the bottom by means of nut 8 to the spindle S, and at the top to the spokes 9 of the steering wheel 10 by means of flange 4 and rivets 11.

In the exemplary embodiment of FIG. 1, the support body is enveloped with a covering 12, which can consist of a plastic material or can be provided with predetermined fracture points 13, which yield in the case of an impact load or can break at the predetermined fracture points, and thus clear the buckling path for the deformation of the support elements 2. As in FIG. 3, the covering can also consist of two elastic truncated cones 16 and 14, which engage each other at their contact zone 15. This engagement is released in the case of a collision accident.

What is claimed is:

1. An energy absorption element adapted for connecting a vehicular steering wheel to a steering wheel shaft spaced apart axially from the steering wheel, said element comprising:
   a generally tubular body comprised of a plurality of support members extending axially for placement between the steering wheel and the steering wheel shaft; and
   means comprising a radially outward bend in each of said support members for producing a radially outward collapse of said support members in response to an impact upon the steering wheel, each of said support members comprising a single X-shaped configuration with said radially outward bend being located in the area of intersection of the legs of the X-shaped configuration.

2. The energy absorption element as defined by claim 1, wherein all of said support members comprise an integral piece formed into a tubular configuration.

3. The energy absorption element as defined by claim 2, wherein said integral piece if formed by stamping from the wall of a tubular piece of metal.

4. The energy absorption element as defined by claim 1, wherein all of said support members are individually formed and said element further includes means for fastening said support members together at their ends.

5. The energy absorption element as defined by claim 1, further comprising means, including a flange connecting the top ends of said support members, for connecting said element to the steering wheel.

6. The energy absorption element as defined by claim 1, further comprising means, including a disc connected to the bottom ends of said support members and a hub fastened at the center of said disc, for connecting said element to the steering wheel shaft.

7. The energy absorption element as defined by claim 1, further comprising a generally tubular casing surrounding said element, said casing being yieldable in response to collapse of said support members.

8. The energy absorption element as defined by claim 7, wherein said casing comprises a pair of truncated plastic cones abutting each other at their respective bases.

9. The energy absorption element as defined by claim 1, wherein said tubular body comprises three of said support members.

10. A steering wheel assembly, comprising:
    (a) a steering wheel;
    (b) a steering wheel shaft spaced apart axially from said steering wheel; and
    (c) an energy absorption element connecting said steering wheel to said shaft, said energy absorption element comprising
       a generally tubular body comprised of a plurality of support members extending axially for placement betweeen the steering wheel and the steering wheel shaft; and
    means comprising a radially outward bend in each of said support members for producing a radially outward collapse of said support members in response to an impact upon the steering wheel, each of said support members comprising a single X-shaped configuration with said radially outward bend being located in the area of intersection of the legs of the X-shaped configuration.

* * * * *